(12) United States Patent
Krishnaswamy et al.

(10) Patent No.: US 8,314,797 B1
(45) Date of Patent: Nov. 20, 2012

(54) METHOD AND APPARATUS FOR IRRADIANCE COMPUTATION IN 3-D COMPUTER GRAPHICS

(75) Inventors: Aravind Krishnaswamy, San Jose, CA (US); Gavin S. P. Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 700 days.

(21) Appl. No.: 12/354,598

(22) Filed: Jan. 15, 2009

Related U.S. Application Data

(60) Provisional application No. 61/099,107, filed on Sep. 22, 2008.

(51) Int. Cl.
 *G06T 15/50* (2011.01)
 *G06T 15/00* (2011.01)
(52) U.S. Cl. .................. 345/426; 345/419
(58) Field of Classification Search ......... 345/426, 345/419
 See application file for complete search history.

(56) References Cited

PUBLICATIONS

Don P. Mitchell, "Generating Antialiased Images at Low Sampling Densities," AT&T Bell Laboratories, Computer Graphics, vol. 21, No. 4, ACM, Jul. 1987, 8 pages.
Mahesh Ramasubramanian, et al., "A Perceptually Based Physical Error Metric for Realistic Image Synthesis,"Program of Computer Graphics/Cornell University, SIGGRAPH 99, Los Angeles, CA ACM 1999, pp. 73-82.
Mark R. Bolin, et al., "A Perceptually Based Adaptive Sampling Algorithm," Dept. of Computer and Information Science/University of Oregon, 1998, 11 pages.
Smyk M., Myszkowski K.: "Quality Improvement for Indirect Illumination Interpolation," In ICCVG (2002), Zakopane, Sep. 25-29, 2002, 8 pages.
William A. Stokes , James A. Ferwerda , Bruce Walter , Donald P. Greenberg: "Perceptual Illumination Components: A New Approach to Efficient, High Quality Global Illumination Rendering," ACM Transactions on Graphics (TOG), v.23 n. 3, Aug. 2004, 8 pages.
Kajiya, J. T. 1986. The rendering equation. Proc. SIGGRAPH 86 (Aug.), 143-150.
Krivanek, J., et al., Improved radiance gradient computation. In SCCG '05: Proceedings of the 21st spring conference on Computer graphics, ACM Press, New York, NY, USA, 155-159, (2005).
Krivanek, J., et al., 2005. Radiance caching for efficient global illumination computation. IEEE Transactions on Visualization and Computer Graphics 11, 5 (Sep./Oct.). Also available as Technical Report #1623, IRISA.
Halton, J. H. 1960. On the efficiency of certain quasi-random sequences of points in evaluating multi-dimensional integrals. Numerische Mathematik, 2(1):84-90.

(Continued)

*Primary Examiner* — Javid A Amini
*Assistant Examiner* — Peter Hoang
(74) *Attorney, Agent, or Firm* — Robert C. Kowert; Meyertons, Hood, Kivlin, Kowert & Goetzel, P.C.

(57) ABSTRACT

Method and apparatus that employs one or more perceptual metrics in determining a priori a number of samples to take at each location during irradiance computation. A number of hemisphere samples to be taken at each location in a scene may be calculated according to one or more perceptual metrics corresponding to the location. Perceptual metrics that may be used may include one or more of, but are not limited to: the overall direct lighting at the location; the diffuse texture of the surface at or around the location; and the color at the location. An irradiance value for each location may be calculated according to the number of samples calculated for the location. This perceptual metrics technique for determining a priori the number of samples needed is orthogonal to conventional adaptive sampling techniques, and can be adapted for use in other irradiance computation techniques.

33 Claims, 16 Drawing Sheets

PUBLICATIONS

Jensen, H. W. and Christensen, N. J. 1995. Optimizing path tracing using noise reduction filters. In Proceedings of WSCG 1995, pp. 134-142.

Keller, A. and Heidrich, W. 2001. Interleaved sampling. In Proceedings of the 12th Eurographics Workshop on Rendering Techniques, London, UK. Springer-Verlag, pp. 269-276. ISBN 3-211-83709-4.

Kontkanen, J., Rasanen, J., and Keller, A. 2004. Irradiance filtering for monte carlo ray tracing. In Monte Carlo and Quasi-Monte Carlo Methods 2004, Springer, pp. 259-272.

Kopf, J., Cohen, M., Lischinski, D., and Uyttendaele, M. 2007. Joint bilateral upsampling. ACM Transactions on Graphics (Proceedings of SIGGRAPH 2007), 26(3):96.

Lindemann, S. and Lavalle, S. 2003. Incremental low discrepancy lattice methods for motion planning. In Robotics and Automation, 2003. Proceedings. ICRA '03. IEEE International Conference on, vol. 3, pp. 2920-2927 vol. 3.

McCool, M. D. 1999. Anisotropic diffusion for monte carlo noise reduction. ACM Trans. Graph., 18(2):171-194. ISSN 0730-0301.

Segovia, B., Iehl, J.-C., Mitanchey, R., and P'Eroche, B. 2006. Non-interleaved deferred shading of interleaved sample patterns. In Proceedings of Graphics Hardware, pp. 53-60.

I.M. Sobol, "On quasi-Monte Carlo integrations," Mathematics and Computers in Simulation 47 (1998) pp. 103-112, Institute for Mathematical Modelling of the Russian Academy of Sciences, 4 Miusskaya Square, Moscow 125047, Russia.

Wald, I., Kollig, T., Benthin, C., Keller, A., and Slusallek, P. 2002. Interactive Global Illumination using Fast Ray Tracing. In Proceedings of the 13th Eurographics Workshop on Rendering, Saarland University, Kaiserslautern University.

Krivanek, J. and Gautron, P. 2009. "Practical Global Illumination With Irradiance Caching", Morgan & Claypool Publishers, 148 pages.

Bradley, P., Fox, B. L., "Implementing Sobol's quasirandom sequence generator," ACM Transactions on Mathematical Software (TOMS), vol. 14, Issue 1 (Mar. 1988), pp. 88-100, Year of Publication: 1988, ISSN:0098-3500.

Krivanek, J. and Gautron, P. "Practical Global Illumination With Irradiance Caching", SIGGRAPH 2008 Class, 405 pages.

Velazquez-Armendariz, E., Lee, E., Bala,K., and Walter, B. 2006. Implementing the render cache and the edge-and-point image on graphics hardware. In GI'06: Proceedings of the 2006 conference on Graphics interface, Canadian Information Processing Society, Toronto, Ont., Canada, Canada, 211-217.

Ward, G. J., and Heckbert, P. 1992. Irradiance Gradients. In Third Eurographics Workshop on Rendering, 85-98.

Ward, G. J., Rubinstein, F. M., and Clear, R. D. 1988. A ray tracing solution for diffuse interreflection. In SIGGRAPH '88: Proceedings of the 15th annual conference on Computer graphics and interactive techniques, ACM Press, New York, NY, USA, 85-92.

U.S. Appl. No. 12/142,246, filed Jun. 19, 2008.
U.S. Appl. No. 12/142,176, filed Jun. 19, 2008.
U.S. Appl. No. 12/324,137, filed Nov. 26, 2008.
U.S. Appl. No. 12/854,785, filed Aug. 11, 2010.

Yang, L., Sander, P. V., and Lawrence, J. 2008. Geometry-aware Framebuffer Level of Detail. Computer Graphics Forum (Proceedings of the Eurographics Symposium on Rendering 2008)., 27(4):1183-1188. ISSN 0167-7055.

METHOD AND APPARATUS FOR IRRADIANCE COMPUTATION IN 3-D COMPUTER GRAPHICS

This application claims benefit of priority of U.S. Provisional Application Ser. No. 61/099,107 entitled "Method and Apparatus for Irradiance Computation in 3-D Computer Graphics" filed Sep. 22, 2008, the content of which is incorporated by reference herein in its entirety.

BACKGROUND

Description of the Related Art

Three-dimensional (3-D) computer graphics is concerned with digitally synthesizing and manipulating 3-D visual content. In 3-D computer graphics, global illumination rendering is a method that attempts to capture the way in which light interacts in the real world. Global illumination algorithms generally take into account the light that comes directly from a light source (direct illumination), and also light rays from the same source reflected by other surfaces in the scene (indirect illumination). The results achieved by global illumination rendering processes may produce more photo-realistic synthesized or manipulated images. FIG. 1 illustrates exemplary ray-traced models without and with global illumination effects applied. The image on the left of FIG. 1 was rendered with no global illumination effect. The image on the right of FIG. 1 was rendered using a global illumination effect.

Conventional global illumination rendering methods are computation-intensive and time-consuming processes, and are thus typically used for off-line rendering rather than in real-time image generation, for example in computer-generated imagery (CGI) applications. Computer-generated imagery (CGI) is the application of the field of computer graphics in various media including, but not limited to: films, television programs, commercials, simulators and simulation generally, and printed media. CGI images are typically produced "off-line"; that is, not in real-time.

Irradiance computation may be performed in a 3-D image rendering process in order to capture global illumination effects such as diffuse inter-reflection (color bleeding). Irradiance computation is widely used in 3-D computer graphics to generate realistic looking images. FIG. 2A shows an exemplary rendered image on which irradiance calculations were not performed. In other words, the global illumination effects include only direct lighting computation. FIG. 2B shows the same exemplary image rendered with both indirect and direct lighting computation.

Ray tracing is a general technique from geometrical optics for modeling the paths taken by light as it interacts with optical surfaces. To perform global illumination rendering, rays may be fired from a perspective point, for example starting at the bottom of the scene. FIG. 3A illustrates the firing of rays at an exemplary image. The rays 106 may be fired from the perspective point 104 of a "viewer" of the scene 100. Light sources 102A and 102B show the approximate location of light sources in scene 100. Conventionally, for each pixel, or point, in the scene 100, a ray 106 is fired into the pixel. Each time a ray 106 hits a point on a surface in the scene 100, for example point 108, direct radiance, i.e. light received at the point directly from a light source, may be calculated for the point. If diffuse inter-reflection, or indirect irradiance, is being determined, light from a light source (as well as light reflected off another surface) may be assumed to "bounce" off a surface in the scene and hit points on other surfaces in the scene, and thus an indirect radiance value for the point is calculated according to the light that reaches the point indirectly from one or more other surfaces. FIG. 3B illustrates point 108 of FIG. 3A with several exemplary direct light sources and indirect light sources.

In order to calculate diffuse inter-reflection, an irradiance calculation is conventionally performed at every point on surfaces that are mapped to the screen. The irradiance calculation is conventionally performed by casting and integrating many rays, or "samples", over a hemisphere at each point on a surface that is mapped to the screen. FIG. 3C illustrates the casting of exemplary sample rays at point 108 of the scene 100 from FIGS. 3A and 3B when performing an irradiance calculation for the point. If too few rays are cast at a point, the resulting irradiance calculation may have a high amount of noise, which is undesirable. If too many rays are cast, the irradiance calculation can be very computationally expensive.

Adaptive irradiance schemes have been developed which adaptively cast more rays in order to reduce variance. However, to realize maximum speed while maintaining quality, rays should be cast over the hemisphere using a jittered sampling pattern. Jittered sampling may be broadly defined as a stochastic process in which values are sampled uniformly over a rectilinear subspace. Using a jittered sampling pattern, the exact position of the respective sample in each subrectangle is thereby varied randomly. However, this is difficult to do if iteratively casting catches of rays over the hemisphere, as would be required in any adaptive irradiance scheme. Jittered sampling would work best when an exact, or nearly exact, number of rays (samples) required has been predetermined.

Polar Coordinates

In three-dimensional polar coordinate systems, including spherical coordinates, the azimuth of a point is the angle between the positive x-axis (also referred to as the polar axis or polar angle) and the projection of the vector onto the xy-plane (the component of the vector in the xy-plane).

SUMMARY

Embodiments of a method and apparatus for diffuse indirect lighting, or irradiance, computation in three-dimensional (3-D) computer graphics that employs one or more perceptual metrics in determining a priori a number of samples to take at each location during irradiance computation are described. Embodiments may employ one or more perceptual metrics to estimate a priori how many samples are needed. This perceptual metrics technique for determining a priori the number of samples is orthogonal to conventional adaptive sampling techniques, and can be adapted for use in other irradiance computation techniques. By calculating a priori a good estimate of the number of samples needed, embodiments provide a better starting point for conventional techniques. Irradiance computations using embodiments may generate rendered images that are perceptually of the same level of quality as images generated using conventional techniques, but with less compute cost, and thus faster.

Embodiments may provide a method for diffuse indirect lighting computation that reduces the expense of the irradiance computation or subprocess for at least some scenes. Typical scenes have some regions where less sampling may be performed due to one or more perceptual metrics; for example if the region is brightly lit by direct light from one or more light sources (a direct illumination metric), if the region is highly textured (a surface texture metric), or if the diffuse texture of the region is dark (a color metric), fewer samples may be taken, since noise is less perceptible in such regions.

Conversely, one or more perceptual metrics may be used to determine regions where more samples need to be taken. A calculation to determine a number of samples using these perceptual metrics may be performed at each location of the scene for which irradiance is to be calculated according to a perceptual metrics algorithm. This calculation may be applied to the entire image, but the amount of sampling varies spatially across the image depending on the estimated masking effect of the other components of the image.

In one embodiment of a method or algorithm for computing a number of samples to take along the polar angle of a hemisphere at a location on a surface in a scene using perceptual metrics, a baseline number of samples may be calculated from a current shaded value metric. A number of samples to add may be calculated from a diffuse texture gradient metric. The sum of the baseline number of samples and the number of samples to add may be scaled by a diffuse texture factor to generate the number of samples to take in the polar direction.

Embodiments may generate a matte or other data structure that indicates how much sampling to do in different regions of the scene. This information may then be provided to an irradiance computation component of a global illumination process and used to determine how many samples to take at each location for which irradiance is to be calculated.

In one embodiment of a method for irradiance computation using perceptual metrics in determining a number of samples to be taken at locations on surfaces in a scene being rendered, a location on a surface in a scene may be obtained for which a number of samples to be taken is to be calculated. Value(s) for one or more perceptual metric(s) corresponding to the location may be obtained. Perceptual metrics that may be used may include one or more of, but are not limited to: the overall direct lighting at the location; the diffuse texture of the surface at or around the location; and the color at the location. A perceptual metrics algorithm may be applied to the value(s) to determine a number of samples along a polar angle of a hemisphere corresponding to the location. The above may be repeated for each location in the scene for which a number of samples to be taken is to be calculated.

The calculated number of samples to take along the polar axes of the hemispheres corresponding to the locations in the scene may be output, for example, as a matte, or as some data structure, to an irradiance computation component of a global illumination process. In one embodiment of such a process, a location in a scene for which irradiance is to be calculated may be obtained. For example, a primary ray, fired into the scene from a perspective point in a ray tracing algorithm, may strike a point on a surface in the scene; the point would be the location. As another example, the location may be a surface fragment in a rasterization algorithm. Other methods to obtain the location may be used. A number of samples along an azimuthal angle of the hemisphere may be determined from the calculated number of polar samples corresponding to the location. In one embodiment, the number of polar samples may be multiplied by a factor, for example 3 or 4, to determine the number of samples along the azimuthal angle. The number of samples may then be used to perform sampling in calculating an irradiance value for the location. The above may be repeated for each location in the scene for which irradiance is to be calculated.

Figure 1:
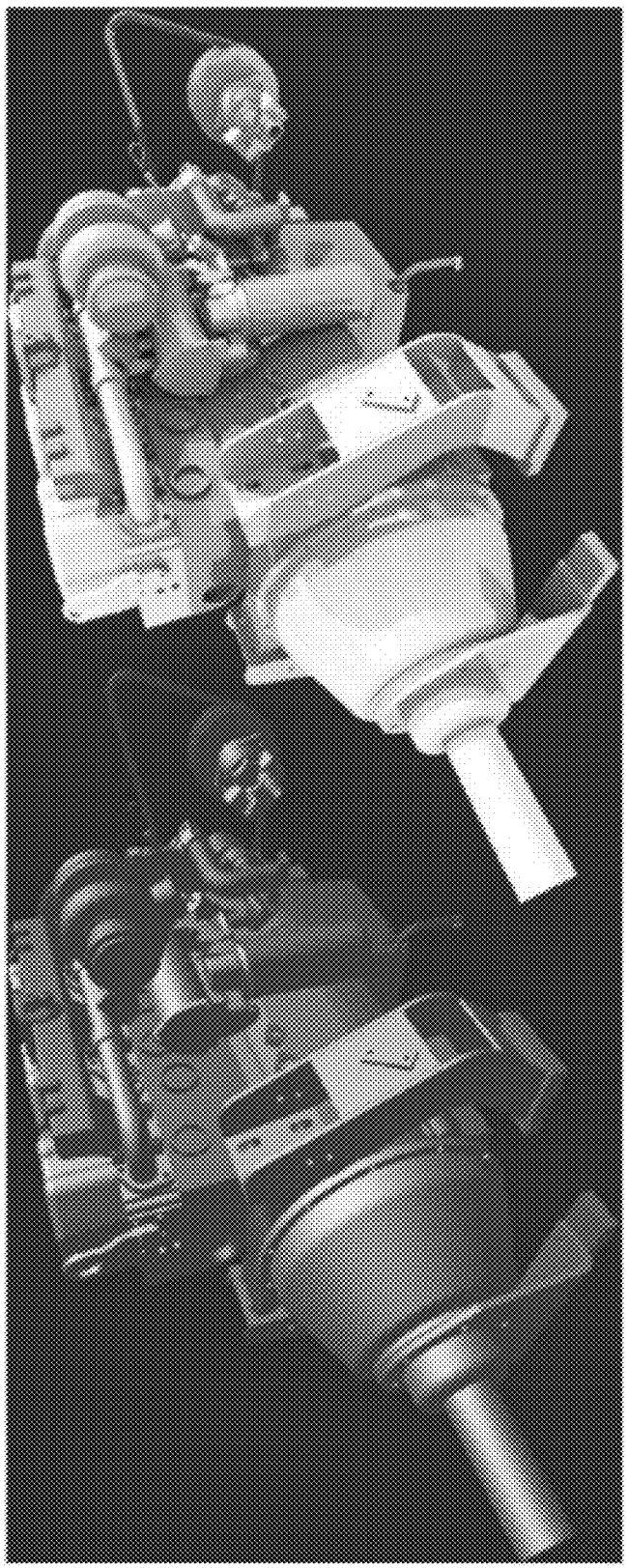
FIG. 1 illustrates ray-traced models without and with global illumination effects.
Figure 2A:
FIG. 2A shows an exemplary rendered image on which irradiance calculations were not performed.
Figure 2B:
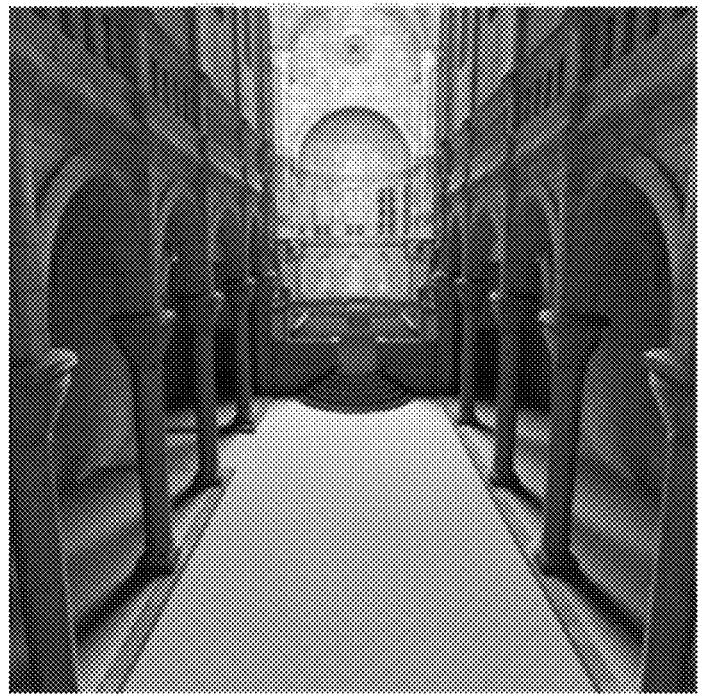
FIG. 2B shows the same exemplary image rendered with both indirect and direct lighting computation.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 3A:
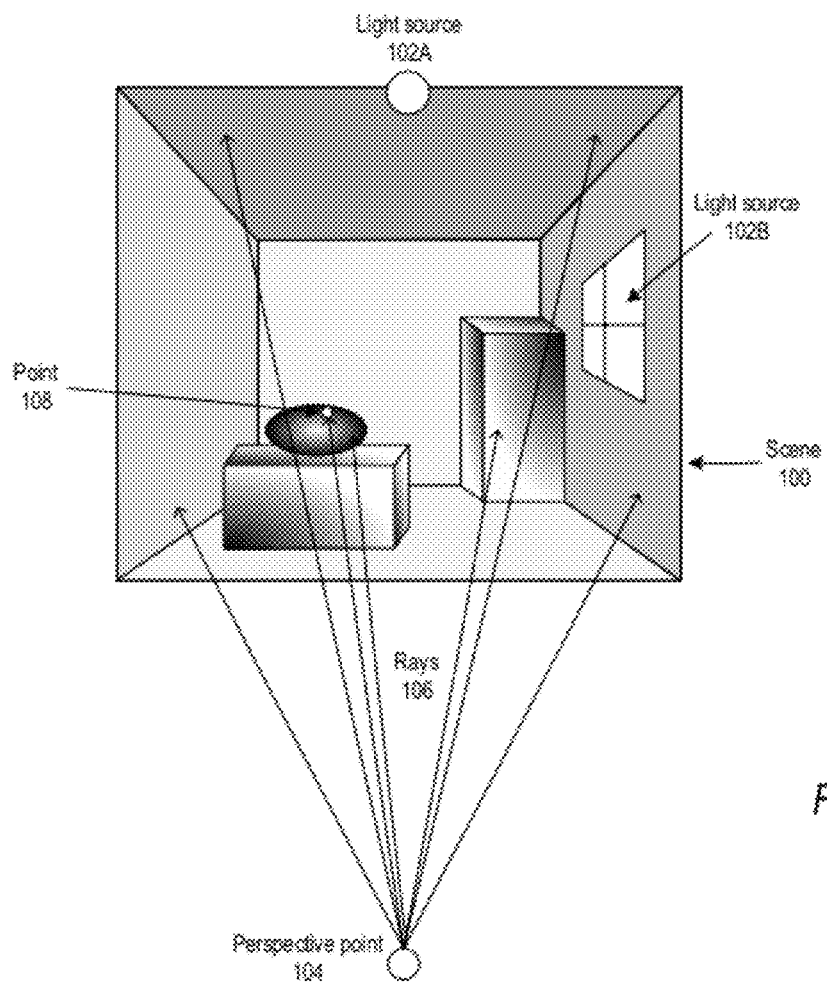
FIG. 3A illustrates the firing of rays at an exemplary image or scene.
Figure 3B:
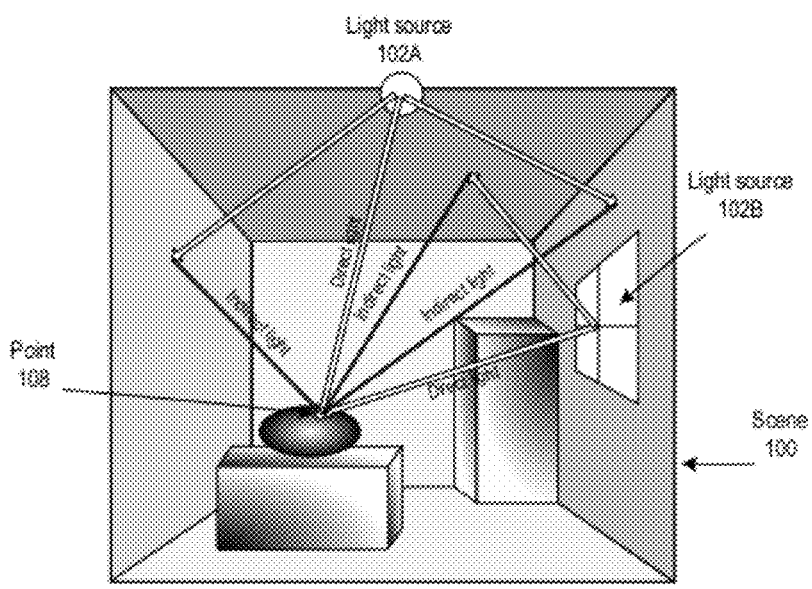
FIG. 3B illustrates a point in a scene with several exemplary direct light sources and indirect light sources.
Figure 3C:
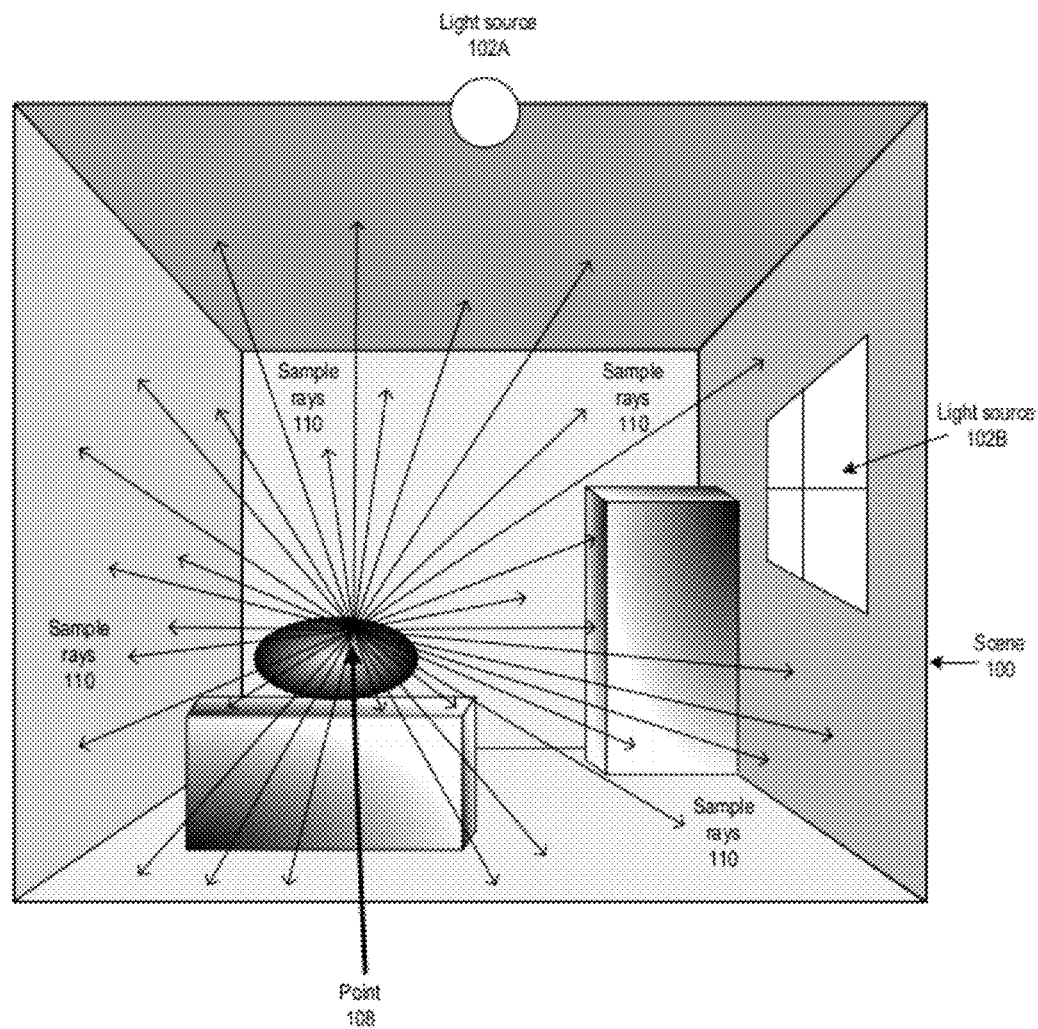
FIG. 3C illustrates the casting of exemplary sample rays at a point in a scene when performing an irradiance calculation for the point.

Various embodiments of a method and apparatus for diffuse indirect lighting, or irradiance, computation in three-dimensional (3-D) computer graphics that employs one or more perceptual metrics in determining a priori a number of samples to take at each location during irradiance computation are described. Conventional global illumination rendering methods are computation-intensive and time-consuming processes. A computationally-intense and thus time-consuming subprocess of global illumination rendering is the computation of indirect lighting that reaches a surface via multiple bounces. Irradiance is the sum of incoming light (radiance) projected on a surface point. To evaluate this integral in a rendering system, integration, for example Monte-Carlo integration, may be used. The idea is to point sample the integral to achieve an estimate for the sum of incoming light. Conventionally, in practice, this means casting on the order of thousands of rays outward over the hemisphere around each surface point to get a good estimate of the integral, as illustrated in FIG. 3C. Conventionally, such a computation is very expensive to compute at every visible surface point in a scene. Embodiments may employ one or more perceptual metrics to determine a priori a number of samples to take at each point for irradiance computation.

Conventional brute force global illumination techniques require many samples, and take a lot of time, to produce quality images. Each of the samples has a compute cost. Some improvement in the quality to time ratio may be achieved by adaptively taking more samples over different regions of the hemisphere. However, in order to do the sampling in a way that produces a result that converges quickly, jittered sampling should be performed. In jittered sampling, samples are stratified over a hemisphere, and the samples are then perturbed slightly so that the samples cover the entire hemisphere. A structure or pattern to in the distribution of the samples may cause aliasing. The perturbation of the samples ensures that the samples overall uniformly cover the hemisphere without having such a structure or pattern to their distribution, thus helping to reduce or eliminate aliasing due to the sample distribution. If taking an iterative number of samples as is done in conventional adaptive sampling techniques, it is difficult to get the final distribution of samples to be properly jittered. Jittered sampling would work best when an exact, or nearly exact, number of rays (samples) required has been predetermined. Embodiments may employ one or more perceptual metrics to estimate a priori how many samples are needed. This perceptual metrics technique for determining a priori the number of samples is orthogonal to conventional adaptive sampling techniques, and can be adapted for use in other irradiance computation techniques. By calculating a priori a good estimate of the number of samples needed, embodiments provide a better starting point for conventional techniques. Irradiance computations using embodiments may generate rendered images that are perceptually of the same level of quality as images generated using conventional techniques, but with less compute cost, and thus faster.

Embodiments may provide a method for diffuse indirect lighting computation that reduces the expense of the irradiance computation or subprocess for at least some scenes. Typical scenes have some regions where less sampling may be performed due to one or more perceptual metrics; for example if the region is brightly lit by direct light from one or more light sources (a direct illumination metric), if the region is highly textured (a surface texture metric), or if the diffuse texture of the region is dark (a color metric), fewer samples may be taken, since noise is less perceptible in such regions. Conversely, one or more perceptual metrics may be used to determine regions where more samples need to be taken. A calculation to determine a number of samples using these perceptual metrics may be performed at each location of the scene for which irradiance is to be calculated. This calculation may be applied to the entire image, but the amount of sampling varies spatially across the image depending on the estimated masking effect of the other components of the image.

As noted above, embodiments may take into account several metrics that may influence the noise due to variance from irradiance sampling. When one or more of these metrics is present, the noise due to variance from the irradiance sampling may be relatively imperceptible (to the human eye). Thus, the number of samples needed at each location in a scene may be adjusted according to one or more of the metrics. These metrics may include one or more of, but are not limited to:

Direct illumination metric—If the direct lighting is bright at the location, the light from the irradiance computation is a small proportion of overall lighting;

Surface texture metric—if the diffuse texture on the surface itself contains high frequency data, this effectively masks the noise from irradiance sampling; and Color metric—if the diffuse texture color is dark enough, it may attenuate the irradiance color value so much that it becomes a small proportion of the overall lighting.

With these factors or metrics, and possibly others, taken into consideration, embodiments may implement an algorithm for determining the number of samples to take over a hemisphere at each point during diffuse indirect lighting computation, which may result in enough samples being taken at each point for the noise to be imperceptible, while reducing the number of samples taken at each point when compared to conventional, brute-force methods.

Figure 12:
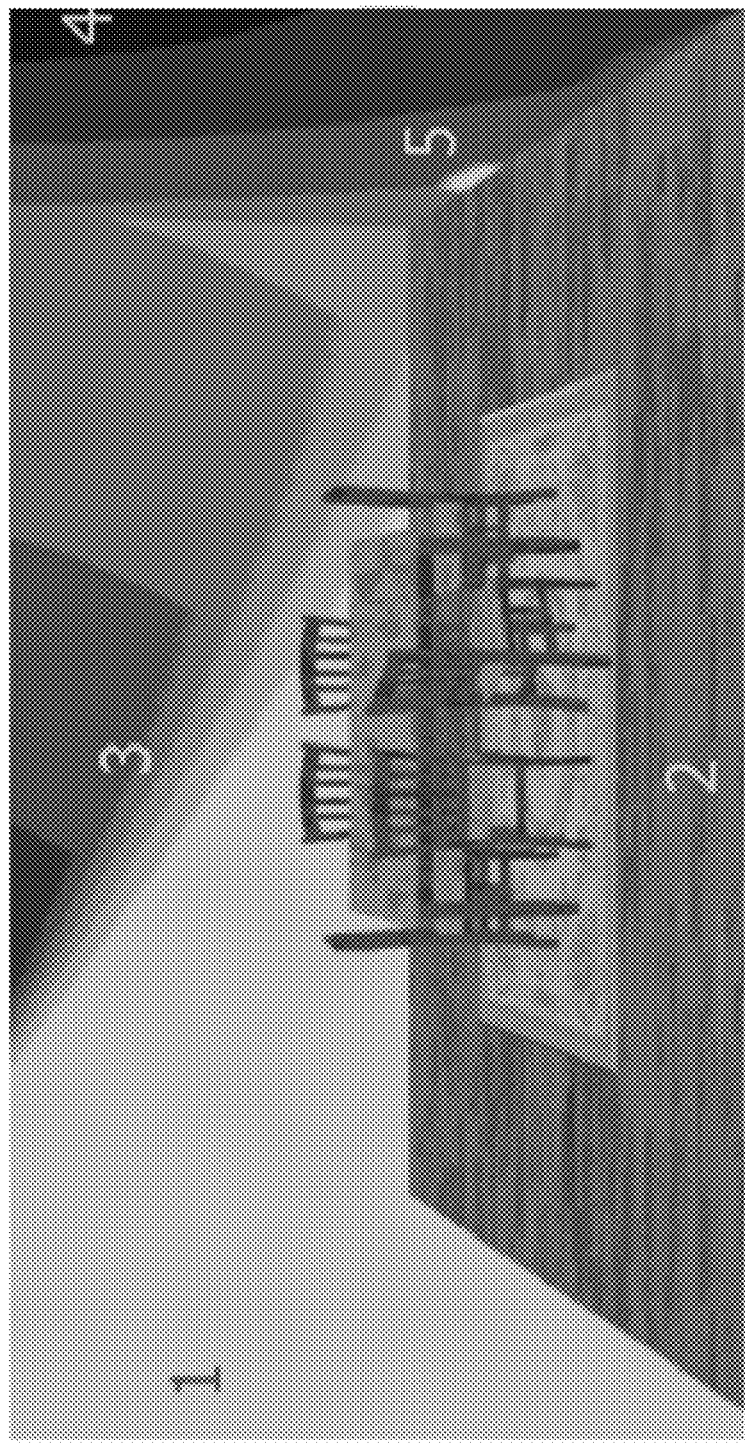
FIG. 12 graphically illustrates a map or matte representing the number of polar samples taken for the dining room scene of FIG. 10 according to one embodiment.

Some embodiments may generate a matte or other data structure that indicates how much sampling to do in different regions of the scene. FIG. 12 illustrates an exemplary generated perceptual metrics matte as an image. This matte may then be provided to an irradiance computation component of a global illumination process to determine how many samples to take at each location for which irradiance is to be calculated. Alternatively, in other embodiments, the perceptual metrics calculations may be performed "on the fly" at each location in an image as the location is being shaded in the global illumination process; in these embodiments, there may be no need to generate a perceptual metrics matte.

Figure 4:
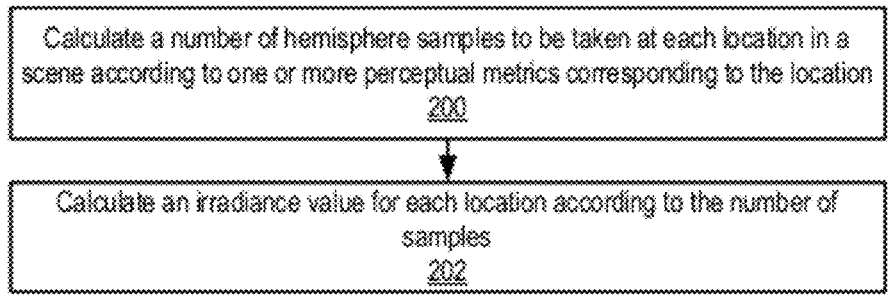
FIG. 4 is a flowchart for irradiance computation using perceptual metrics in determining a number of samples to be taken at locations in a scene being rendered, according to one embodiment.

FIG. 4 is a flowchart for irradiance computation using perceptual metrics in determining a number of samples to be taken at locations in a scene being rendered, according to one embodiment. As indicated at 200, a number of hemisphere samples to be taken at each location in a scene may be calculated according to one or more perceptual metrics corresponding to the location. Perceptual metrics that may be used may include one or more of, but are not limited to: the overall direct lighting at the location; the diffuse texture of the surface at or around the location; and the color at the location. An exemplary embodiment of a perceptual metrics algorithm that may be applied to values of these, or other, metrics at each location to determine a number of samples for the location is described below. As indicated at 202, an irradiance value for each location may be calculated according to the number of samples calculated for the location at 200.

As noted above, some embodiments may generate a matte or other data structure that indicates how much sampling to do in different regions of the scene. This matte may then be provided to an irradiance computation component of a global illumination process to indicate how many samples to take at each location for which irradiance is to be calculated. In these embodiments, element 200 may be performed for all the locations to generate a perceptual metrics matte, and then element 202 may be performed with the perceptual metrics matte as input. Alternatively, in other embodiments, the perceptual metrics calculations may be performed "on the fly" at each location in an image as the location is being shaded in the global illumination process. In these embodiments, during a global illumination process, at each location in a scene, the number of hemisphere samples to be taken at the location may be calculated, and then an irradiance value for the location may be calculated according to the number of samples calculated for the location.

Figure 5:
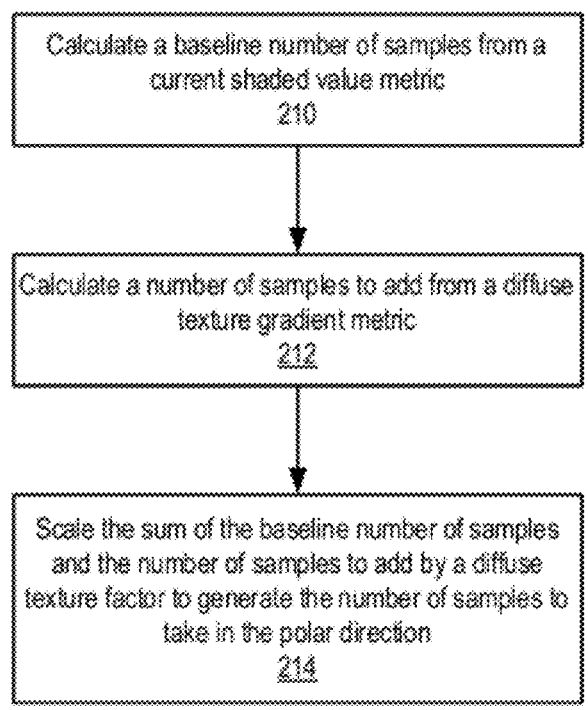
FIG. 5 is a flowchart of a method or algorithm for computing a number of samples to take along the polar angle of a hemisphere at a location in a scene using perceptual metrics, according to one embodiment.

FIG. 5 is a flowchart of a method or algorithm for computing a number of samples to take along the polar angle of a hemisphere at a location in a scene using perceptual metrics, according to one embodiment. As indicated at 210, a baseline number of samples may be calculated from a current shaded value metric (the direct illumination metric). As indicated at 212, a number of samples to add may be calculated from a diffuse texture gradient metric (the surface texture metric). As indicated at 214, the sum of the baseline number of samples and the number of samples to add may be scaled by a diffuse texture factor (the color metric) to generate the number of samples to take in the polar direction.

Figure 6:
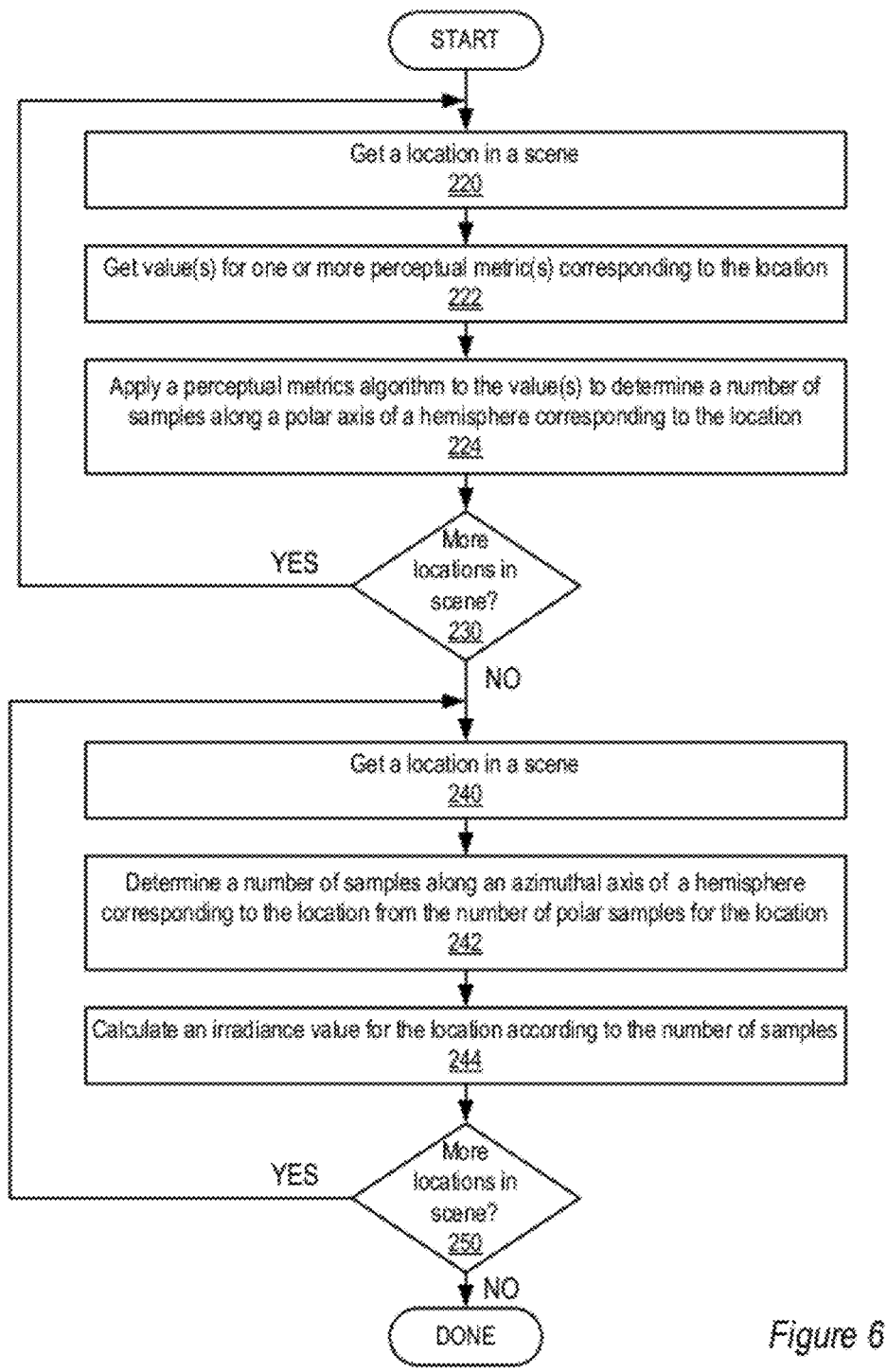
FIG. 6 shows a flowchart for irradiance computation using perceptual metrics in determining a number of samples to be taken at locations in a scene being rendered, according to some embodiments in which a data structure is generated indicating the number of samples to be taken at the locations and then passed to a global illumination rendering process.

FIG. 6 shows a more detailed flowchart for irradiance computation using perceptual metrics in determining a number of samples to be taken at locations in a scene being rendered, according to some embodiments. This flowchart corresponds to embodiments that generate a matte or other data structure that indicates how much sampling to do in different regions of the scene that is then provided to an irradiance computation component of a global illumination process. As indicated at 220, a location in a scene may be obtained for which a number of samples to be taken is to be calculated. For example, a primary ray, fired into the scene from a perspective point in a ray tracing algorithm, may strike a point on a surface in the scene; the point would be the location. As another example, the location may be a surface fragment in a rasterization algorithm. Other methods to obtain the location may be used.

As indicated at 222, value(s) for one or more perceptual metric(s) corresponding to the location may be obtained. Perceptual metrics that may be used may include one or more of, but are not limited to: the overall direct lighting at the location; the diffuse texture of the surface at or around the location; and the color at the location.

As indicated at 224, a perceptual metrics algorithm may be applied to the value(s) to determine a number of samples along a polar angle of a hemisphere corresponding to the location. An exemplary embodiment of a perceptual metrics algorithm that may be applied to values of these, or other, metrics at the location to determine a number of samples along a polar angle of a hemisphere corresponding to the location is described in FIG. 5 and further described below.

At 230, if there are more locations in the scene for which the number of samples to be taken along the polar angle is to be calculated, the method returns to 220. Otherwise, the perceptual metrics calculations are done. The calculated number of samples to take along the polar axes of the hemispheres corresponding to the locations in the scene may be output, for example, as a matte, or as some data structure, to an irradiance computation component of a global illumination process. FIG. 12 illustrates an exemplary generated perceptual metrics matte as an image. The rest of the flowchart illustrates an exemplary application of the output perceptual metrics matte by an irradiance computation component of a global illumination process.

As indicated at 240, a location in a scene for which irradiance is to be calculated may be obtained. For example, a primary ray, fired into the scene from a perspective point in a ray tracing algorithm, may strike a point on a surface in the scene; the point would be the location. As another example, the location may be a surface fragment in a rasterization algorithm. Other methods to obtain the location may be used.

As indicated at 242, a number of samples along an azimuthal angle of the hemisphere may be determined from the calculated number of polar samples corresponding to the location. In one embodiment, the number of polar samples may be multiplied by a factor, for example 3 or 4, to determine the number of samples along the azimuthal angle.

As indicated at 244, a total number of samples N may be determined as a multiplication of the number of polar samples and the number of azimuthal samples and then may be used to perform sampling in calculating an irradiance value for the location. In some embodiments, a jittering technique may be used to distribute the N samples over the hemisphere or over regions of the hemisphere. At 250, if there are more locations in the scene for which irradiance is to be calculated, the method returns to 240. Otherwise, the method is done.

Figure 7:
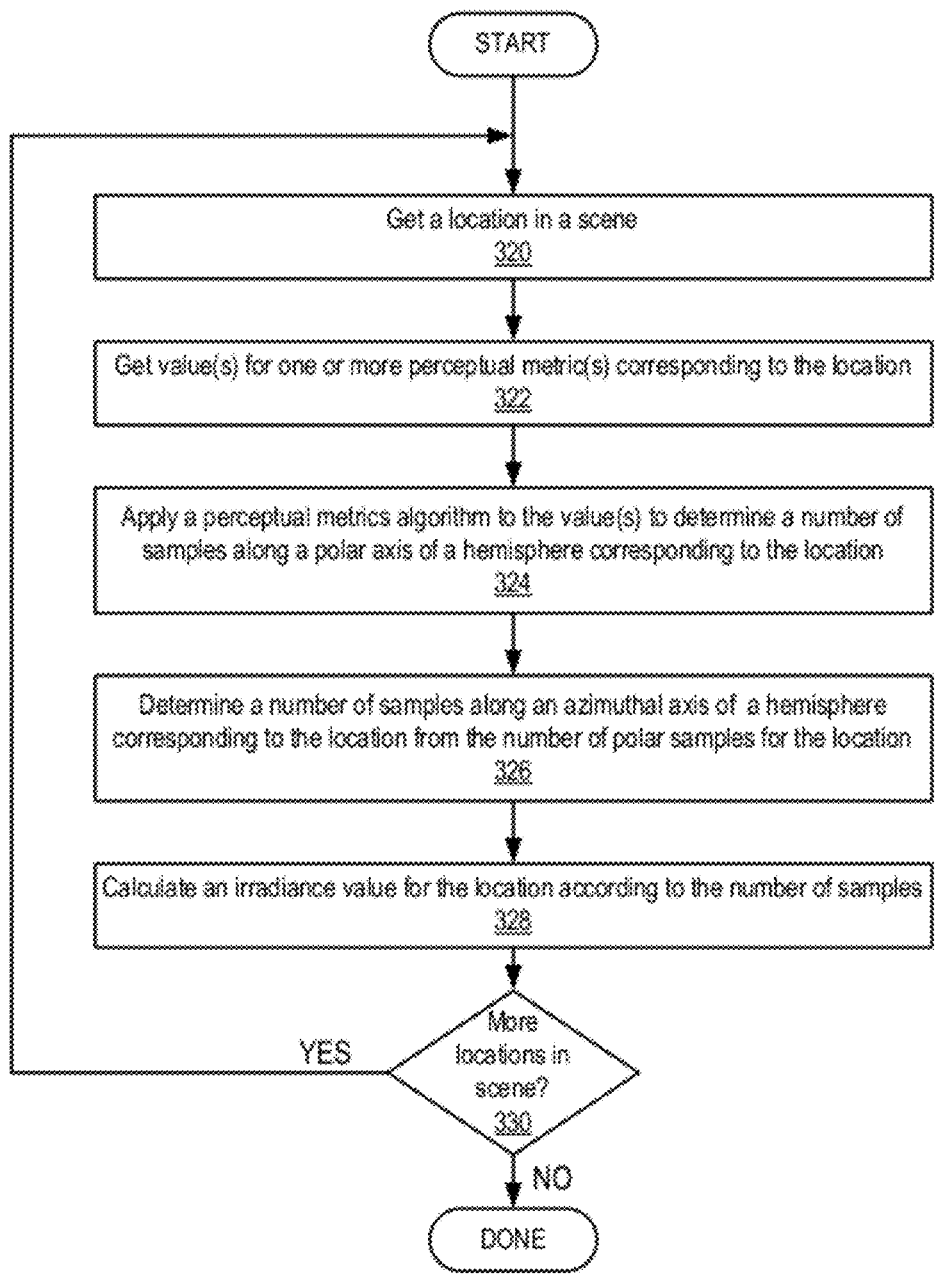
FIG. 7 shows a flowchart for irradiance computation using perceptual metrics in determining a number of samples to be taken at locations in a scene being rendered, according to some embodiments in which the number of samples to be taken at the locations are generated "on the fly" during the global illumination rendering process.

FIG. 7 shows a more detailed flowchart for irradiance computation using perceptual metrics in determining a number of samples to be taken at locations in a scene being rendered, according to some embodiments. This flowchart corresponds to embodiments in which the perceptual metrics calculations are performed "on the fly" at each location in an image as the location is being shaded in the global illumination process. As indicated at 320, a location in a scene may be obtained for which a number of samples to be taken is to be calculated. For example, a primary ray, fired into the scene from a perspective point in a ray tracing algorithm, may strike a point on a surface in the scene; the point would be the location. As another example, the location may be a surface fragment in a rasterization algorithm. Other methods to obtain the location may be used.

As indicated at 322, value(s) for one or more perceptual metric(s) corresponding to the location may be obtained. Perceptual metrics that may be used may include one or more of, but are not limited to: the overall direct lighting at the location; the diffuse texture of the surface at or around the location; and the color at the location.

As indicated at 324, a perceptual metrics algorithm may be applied to the value(s) to determine a number of samples along a polar angle of a hemisphere corresponding to the location. An exemplary embodiment of a perceptual metrics algorithm that may be applied to values of these, or other, metrics at the location to determine a number of samples along a polar angle of a hemisphere corresponding to the location is described in FIG. 5 and further described below.

As indicated at 326, a number of samples along an azimuthal angle of the hemisphere may be determined from the calculated number of polar samples corresponding to the location. In one embodiment, the number of polar samples may be multiplied by a factor, for example 3 or 4, to determine the number of samples along the azimuthal angle.

As indicated at 328, a total number of samples N may be determined as a multiplication of the number of polar samples and the number of azimuthal samples and then may be used to perform sampling in calculating an irradiance value for the location. In one embodiment, a jittering technique may be used to distribute the N samples over the hemisphere or over regions of the hemisphere. At 330, if there are more locations in the scene for which irradiance is to be calculated, the method returns to 320. Otherwise, the method is done.

The following section provides more detail for the exemplary perceptual metrics algorithm of FIG. 5. It is to be noted that variations of the perceptual metrics algorithm as illustrated in FIG. 5 are possible and contemplated.

Perceptual Metrics Algorithm for Irradiance Computation

Embodiments may implement a method for hemisphere sampling that considers and calculates two parameters, the number of samples to take along the polar angle and the number of samples to take along the azimuthal angle of the hemisphere at each location during irradiance computation. It is known that, in order to obtain more accurate results, the number of samples along the azimuthal angle should be proportional to the number of samples along the polar angle multiplied by $\pi$ (pi). In one embodiment, the total number of sample rays to cast will be a multiplication of the number of samples along the polar angle and the number of samples along the azimuthal angle.

In one embodiment, the number of samples to take along the polar angle are calculated according to the perceptual metrics algorithm, and the number of samples along an azimuthal angle is then calculated from the number of samples to take along the polar angle. Since the parameters are expressed as integers, an integer calculation may be performed in which the calculated number of samples to take along the polar angle (an integer) may multiplied by an integer factor, e.g. 3 or 4, to determine the integer number of samples of take along the azimuthal angle. Alternatively, a floating point calculation could be done in which the calculated number of samples to take along the polar angle is multiplied by a real number (e.g., pi), and the resultant floating point number may be rounded or truncated to determine the integer number of samples of take along the azimuthal angle.

In one embodiment, the perceptual metrics algorithm may first compute a baseline number of samples given by:

$$S_b = (1 - C_{max}^2) * (\text{MaxSamples} - \text{MinSamples}) + \text{MinSamples}$$

where:
 $S_b$ = baseline number of samples;
 $C_{max}^2$ = current shaded value; either the maximum value of the components of the current shaded value or the luminance of the current shaded value may be used (in one embodiment, whichever is used may be clamped to 1.0);
 MaxSamples = maximum number of samples to take; and
 MinSamples = minimum number of samples to take.

Note that the current shaded value does not have to be expressed as $C_{max}^2$. While $C_{max}^2$ is used in one exemplary embodiment, other embodiments may use $C_{max}$, $C_{max}^3$, and so on. The above calculation according to a current shaded value corresponds to the direct illumination metric.

The perceptual metrics algorithm may then determine if additional samples need to be added due to the gradient of the diffuse texture being low. In other words, in regions where the gradient is low, the surface color will be smooth, and hence noise will be more visible, so additional samples need to be taken. In one embodiment, the following may be used:

$$S_d = (1 - G) * \text{MaxAddSamples}$$

where:
 G = the surface texture gradient;
 MaxAddSamples = Maximum number of samples to add; and
 $S_d$ = the number of additional samples to add (more samples are taken if the surface texture gradient is low; fewer samples are taken if the surface texture gradient is high).

In one embodiment, the surface texture gradient G may be calculated as follows:

$$G = (\nabla D_x + \nabla D_y)^2$$

where:
  $\nabla D_x$=gradient of diffuse texture in x; and
  $\nabla D_y$=gradient of diffuse texture in y.

In other embodiments, the surface texture gradient G may be calculated in other ways. For example, in other embodiments, G may be calculated as:

$$G = \left(\frac{(\nabla D_x + \nabla D_y)}{2}\right)^2$$

or as:

$$G = \sqrt{(\nabla D_x)^2 + (\nabla D_y)^2}$$

The above calculation according to a surface texture gradient corresponds to the surface texture metric. The perceptual metrics algorithm then scales the number of samples according to the diffuse texture, giving the expression:

$$S_p = (S_b + S_a) * D$$

where:
  $S_b$=baseline number of samples;
  $S_a$=the number of additional samples to add;
  D=diffuse texture factor, which may be either the maximum value in the diffuse color channels or the luminance; and
  $S_p$=the number of samples to take in the polar direction.

The above scaling according to a diffuse texture factor corresponds to the color metric.

In various embodiments, MaxSamples, MinSamples, and MaxAddSamples may be constants, or alternatively may be variables that may be set and adjusted by a user, for example via one or more user interface elements for controlling hemisphere sampling provided in an indirect lighting module.

The above-described perceptual metrics algorithm is exemplary and is not intended to be limiting. Other formulations of a perceptual metrics algorithm are possible and contemplated. As one example, the exemplary perceptual metrics (direct illumination metric, surface texture metric, and color metric) may be used in a different order and/or used in different calculations than those described in a perceptual metrics algorithm to generate $S_p$. As another example, other formulations of a perceptual metrics algorithm may use only one of, or a combination of any two of, the exemplary perceptual metrics (direct illumination metric, surface texture metric, and color metric) to generate $S_p$. As yet another example, one or more other metrics may be used instead of one or more of the exemplary perceptual metrics in a perceptual metrics algorithm to generate $S_p$. As still yet another example, one or more other metrics may be used in addition to the exemplary perceptual metrics in a perceptual metrics algorithm to generate $S_p$.

Embodiments of the perceptual metrics algorithm may be implemented in a module or sub-module, which may be referred to as a perceptual metrics module, that accepts as input at least the necessary parameters described for the steps of the algorithm and outputs, at a minimum, $S_p$, the number of samples to take in the polar direction for each location in a scene. $S_p$, the number of samples to take in the polar direction, may be multiplied by a factor, for example 3 or 4, to determine the number of samples to take in an aziumuthal direction ($S_a$). Alternatively, the perceptual metrics module may also calculate and output $S_a$ from the calculated value for $S_p$.

In some embodiments, a total number of samples N may be determined as a multiplication of the number of polar samples $S_p$ and the number of azimuthal samples $S_a$, and then N may be used to perform sampling in calculating an irradiance value for the location. In some embodiments, the location may be a surface point in a ray tracing technique. In other embodiments, the location may correspond to a surface fragment in a rasterization technique. Calculating an irradiance value for a surface point in accordance with a ray tracing technique may be performed by casting N sample rays outward over a hemisphere around the surface point to estimate a sum of incoming indirect light to the surface point. A similar calculation may be performed in a rasterization technique, using N samples. In some embodiments, a jittering technique may be used to distribute the N samples over the hemisphere or over regions of the hemisphere.

It is to be noted that an embodiment of a perceptual metrics algorithm is multiplicative with other methods for improving the performance of irradiance computation, including other methods for reducing the number of sample rays needed at various points on surfaces in images being rendered.

Implementations

Embodiments of the perceptual metrics module may, for example, be used in a method for diffuse indirect lighting computation implemented in an indirect lighting module that employs a ray tracing algorithm that calculates irradiance by firing primary rays at surfaces of a scene and, for each point hit, fires rays from the point over a hemisphere, to generate an estimate of the sum of incoming light. Embodiments of the perceptual metrics module may be used in such a system to determine the number of samples to take at each point in a scene. Embodiments of the perceptual metrics module may also be used in a method for diffuse indirect lighting computation implemented in an indirect lighting module that employs a rasterization algorithm, where a similar hemispherical gather is performed at each surface fragment. Embodiments of the perceptual metrics module may be used in such a system to determine the number of samples to take at each surface fragment.

In various embodiments, the method for diffuse indirect lighting computation may be implemented alone (e.g., as a module) or in combination with a direct lighting method (e.g., as a component of a global illumination rendering module). Embodiments of the method for diffuse indirect lighting computation may reduce the time it takes to perform global illumination rendering of a scene by reducing the number of samples taken over a hemisphere during irradiance computation using an embodiment of the perceptual metrics module as described herein, while rendering images with an imperceptible level of noise due to hemisphere sampling in irradiance computation. An implementation of the method for diffuse indirect lighting (irradiance) computation may be referred to as an indirect lighting module. Examples of types of applications in which embodiments of an indirect lighting module may be implemented may include, but are not limited to, scientific, medical, design (e.g., CAD systems), painting, publishing, digital photography, video editing, games, animation, and/or other applications in which digital image generation and/or processing may be performed. Specific examples of applications in which embodiments may be implemented include, but are not limited to, Adobe® Photoshop® and Adobe® After Effects®.

Indirect Lighting Module Implementation

Figure 8:
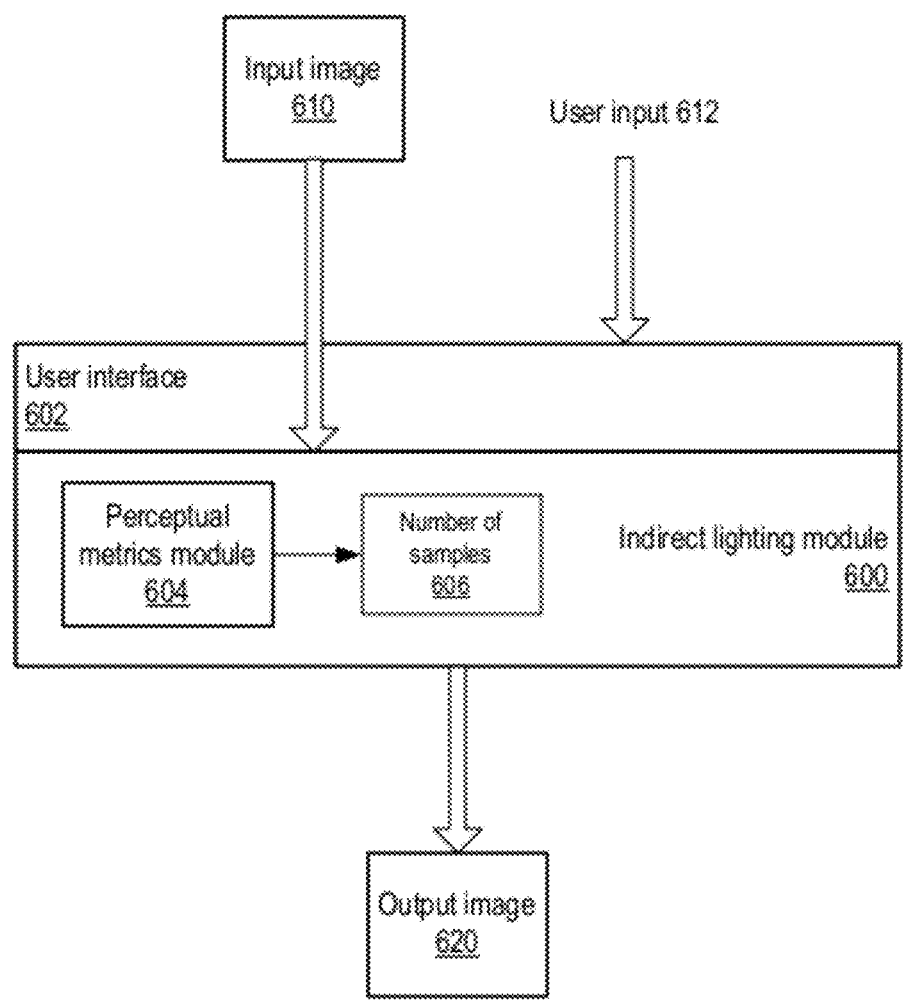
FIG. 8 illustrates an exemplary indirect lighting module that may implement embodiments of a method for diffuse indirect lighting computation including an embodiment of a perceptual metrics algorithm that may reduce the number of samples taken over a hemisphere during irradiance computation.

FIG. 8 illustrates an exemplary indirect lighting module that may implement embodiments of a method for diffuse indirect lighting computation including an embodiment of the perceptual metrics algorithm as described herein that may reduce the number of samples taken over a hemisphere during irradiance computation. Embodiments may be implemented as or in an indirect lighting module 600 as illustrated in FIG. 8. In one embodiment, module 600 may provide a user interface 602 that includes one or more user interface elements via which a user may initiate, interact with, direct, and/or control the method for diffuse indirect lighting computation as performed by module 600. Module 600 may obtain an image 610 or region of an image and, optionally, user input 612, and compute indirect lighting for the image accordingly as described herein to generate an output image 620 from the input image 610. An embodiment of perceptual metrics module 604 may be used to calculate a number of samples 606 to take over a hemisphere at each point in a ray tracing algorithm or at each surface fragment in a rasterization algorithm. While FIG. 8 shows perceptual metrics module 604 as internal to indirect lighting module 600, in some embodiments perceptual metrics module 604 may be implemented external to or separately from module 600, and may implement its own user interface. In one embodiment, output image 620 may be a new image; in other words, input image 610 may be preserved unchanged by module 600. In one embodiment, input image 610 may be directly modified by module 600, and thus output image 620 may represent a modified input image 610.

Indirect lighting module 600 and/or perceptual metrics module 604 may be implemented as or in a stand-alone application or as a module of or plug-in for a graphics application or graphics library that may provide other graphical/digital image processing tools. Examples of types of applications in which embodiments of module 600 and/or module 604 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop® and Adobe® After Effects®. In addition to generating output image 620, module 600 may be used to display, manipulate, modify, and/or store the output image, for example to a memory medium such as a storage device or storage medium.

Global Illumination Rendering Module Implementation

Figure 9:
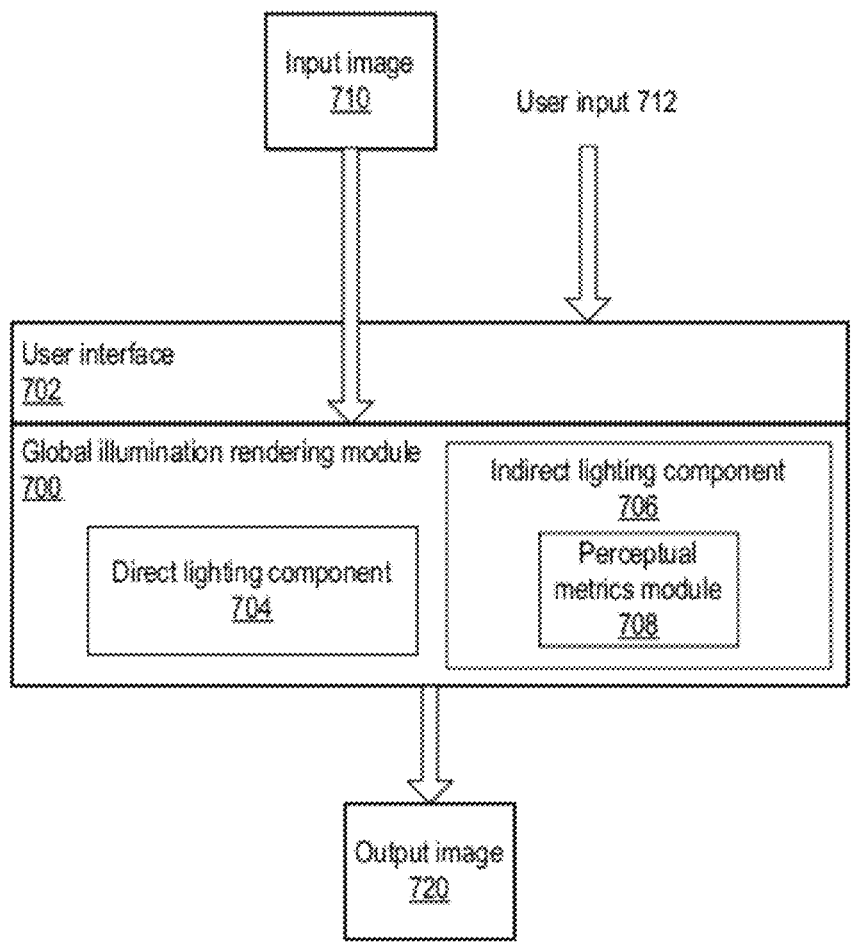
FIG. 9 illustrates an exemplary global illumination rendering module that may implement a method for computing direct lighting and an embodiment of a method for diffuse indirect lighting computation as a direct lighting component and an indirect lighting component, respectively.

FIG. 9 illustrates an exemplary global illumination rendering module that may implement a method for computing direct lighting and an embodiment of the method for diffuse indirect lighting computation described above, as direct lighting component 704 and indirect lighting component 706, respectively. Indirect lighting component 706 may include or implement an embodiment of the perceptual metrics algorithm as described herein that may reduce the number of samples taken over a hemisphere during irradiance computation as perceptual metrics module 708. While FIG. 9 shows perceptual metrics module 708 as internal to indirect lighting component 706, in some embodiments perceptual metrics module 708 may be implemented external to or separately from indirect lighting component 706. In one embodiment, module 700 may provide a user interface 702 that includes one or more user interface elements via which a user may initiate, interact with, direct, and/or control the direct lighting component 704 and/or the indirect lighting component 706. Module 700 may obtain an input image 710 or region of an image and, optionally, user input 712, and compute direct and/or indirect lighting for the image accordingly to generate an output image 720 from the input image 710. Both direct lighting and indirect lighting may be computed for an input image 710; alternatively, either one or the other may be computed. In one embodiment, direct lighting computation and indirect lighting computation may be performed in parallel. In other embodiments, direct lighting computation and indirect lighting computation may be performed serially; that is, one may be performed first, and then the other. In one embodiment, direct lighting computation may be performed first, and then indirect lighting computation. In another embodiment, indirect lighting computation may be performed first.

In one embodiment, output image 720 may be a new image; in other words, input image 710 may be preserved unchanged by module 700. In one embodiment, input image 710 may be directly modified by module 700, and thus output image 720 may represent a modified input image 710.

Global illumination rendering module 700 may be implemented as or in a stand-alone application or as a module of or plug-in for a graphics application or graphics library that may provide other graphical/digital image processing tools. Examples of types of applications in which embodiments of module 700 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop® and Adobe® After Effects®. In addition to generating output image 720, module 700 may be used to display, manipulate, modify, and/or store the output image, for example to a memory medium such as a storage device or storage medium.

Exemplary Results

The following presents exemplary results of an exemplary implementation of a method for irradiance computation that employs the above-described perceptual metrics algorithm to determine a number of samples to take at each point for the irradiance computation. In rendering several test scenes using this implementation, a performance improvement of between 50-100% was realized when compared to a conventional method that uses a fixed number of samples, while rendering an image of comparable perceptible quality.

Figure 10:
FIG. 10 shows a dining room scene that is used as an exemplary test scene, rendered without irradiance calculation.
Figure 11:
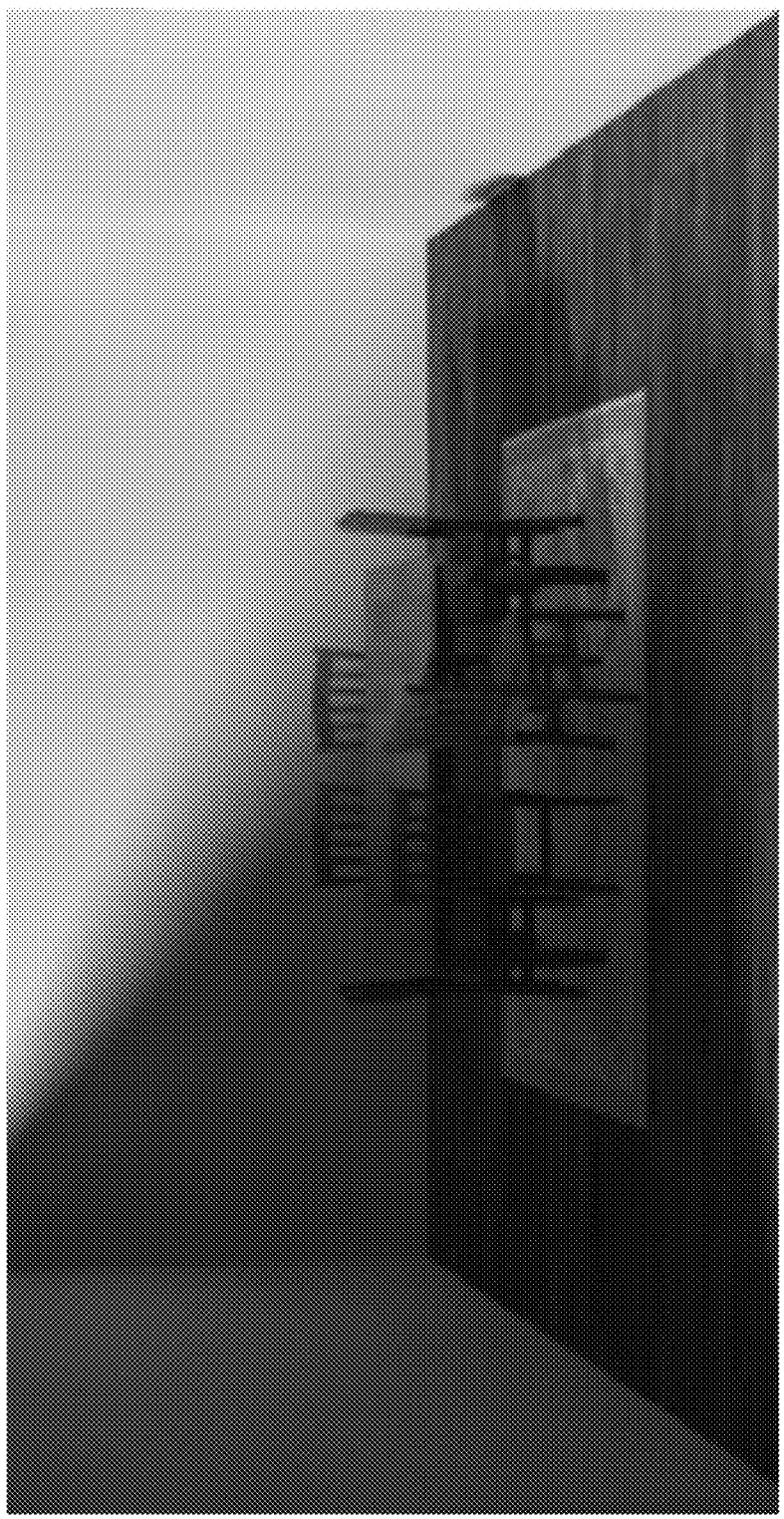
FIG. 11 shows the same scene as FIG. 9, but rendered using an exemplary implementation of the method for irradiance computation that employs a perceptual metrics algorithm to determine the number of samples to take at each point for the irradiance computation.

FIG. 10 shows a dining room scene rendered without irradiance calculation that is used as an exemplary test scene. FIG. 11 shows the same scene as FIG. 10, but rendered using an exemplary implementation of the method for irradiance computation that employs the above-described perceptual metrics algorithm to determine the number of samples to take at each point for the irradiance computation.

FIG. 12 graphically illustrates a map or matte representing the number of polar samples taken for the dining room scene of FIG. 10 according to some embodiments. From the map, the following observations may be made. In the region labeled 1, the wall on the left of the scene uniformly is sampled heavier. This is due to the fact that the diffuse light does not illuminate the wall, and in addition due to the relatively bright diffuse color and low diffuse texture gradient of the wall. In the region labeled 2, the floor, with its combination of dark diffuse texture and high texture gradient, gets many fewer samples than the left wall (region 1). In the region labeled 3, there is a transition from the wall being completely shadowed (dark) on the left to partially illuminated (by a light with soft shadows) to fully illuminated, and it can be seen that, as the illumination increases, the number of irradiance samples decreases. In the region labeled 4, there are brightly light areas of the scene where the direct lighting component is much more significant than the indirect lightning; this region gets very few samples. The region labeled 5, an area where the chair casts a shadow on the wall, is brightly lit. However, region 5 gets a high number of samples since it is shadowed and thus the indirect lighting component will be significant. In addition, the diffuse texture gradient is low.

Figure 13:
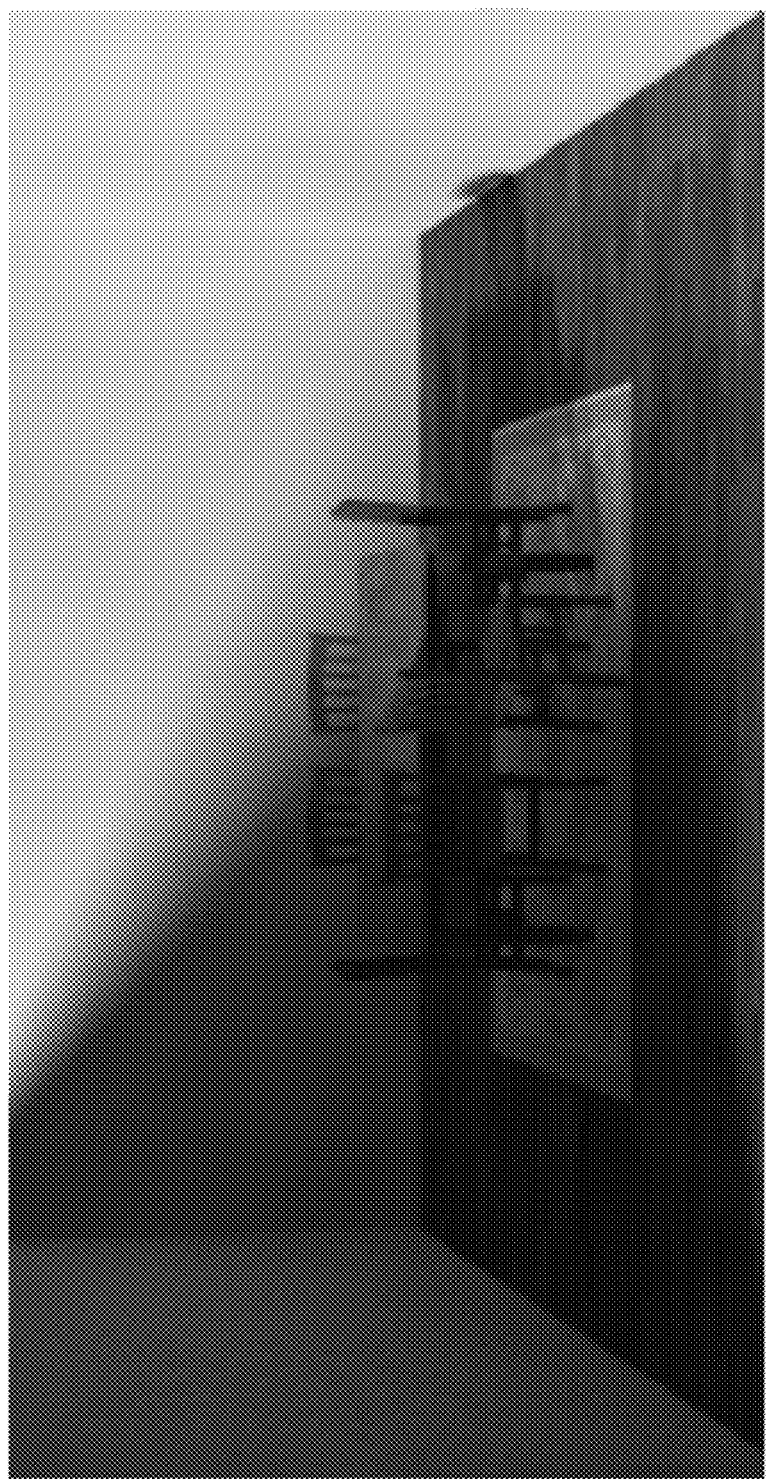
FIG. 13 is used to compare the rendered image of FIG. 10 with the same image rendered with a low but uniform number of samples.
Figure 14:
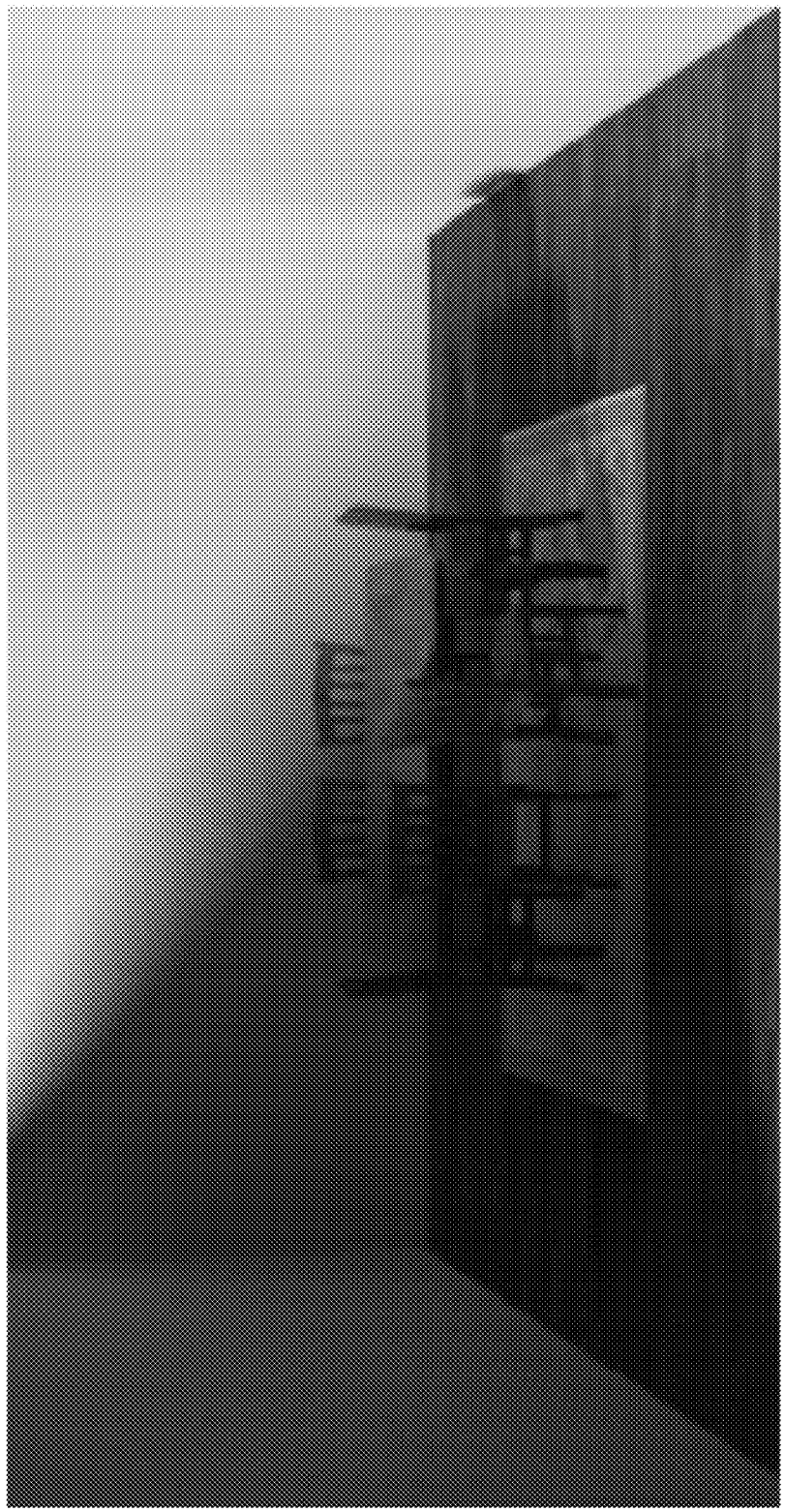
FIG. 14 is used to compare the rendered image of FIG. 11 with the same image rendered with an increased but uniform number of samples to reduce the artifacts.

FIG. 13 may be used to compare the rendered image of FIG. 11 with the same image rendered with a low but uniform number of samples. Using a low number of samples improves rendering time; however, there are significant perceptible artifacts, for example on the left wall, in the rendered image of FIG. 13. FIG. 14 shows the same image rendered with an increased but uniform number of samples to reduce the artifacts. The rendered image in FIG. 14 appears similar in perceptible quality to the image rendered according to embodiments shown in FIG. 11. However the image of FIG. 11 took 84 seconds to render using an embodiment of the perceptual metrics algorithm as described herein to determine a priori the number of samples to take along the polar angle at each hemisphere, whereas the image in FIG. 14 took 150 seconds to render. Note that the lower quality image of FIG. 13 took 48 seconds to render.

Figures 15A, 15B:
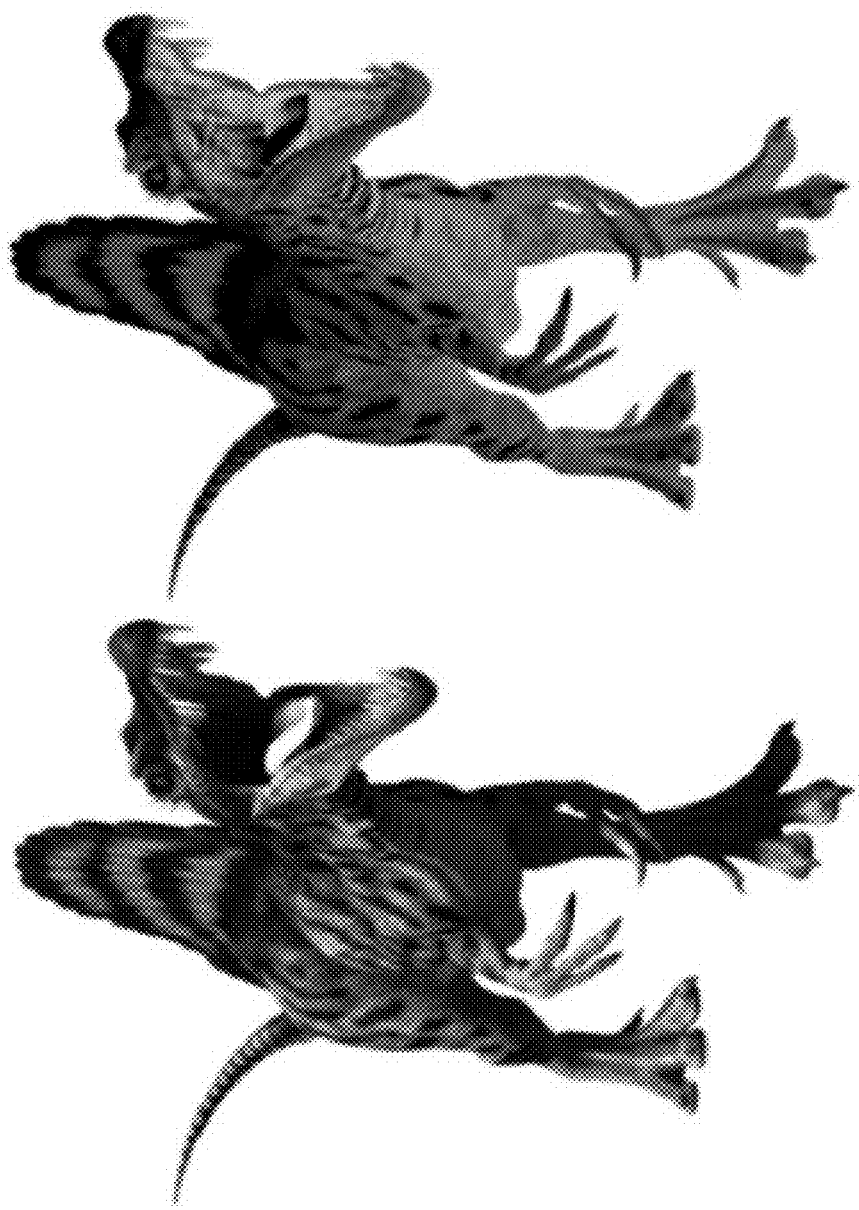
FIG. 15A shows an exemplary image of a raptor rendered using an exemplary implementation of the method for irradiance computation that employs a perceptual metrics algorithm to determine the number of samples to take at each point for the irradiance computation.
FIG. 15B shows the dark regions on the "raw" image of FIG. 14A.

FIG. 15A shows an exemplary image of a raptor rendered using an exemplary implementation of the method for irradiance computation that employs the above-described algorithm to determine the number of samples to take at each point for the irradiance computation. In the exemplary image of FIG. 15A, significant portions of the texture are dark; therefore, embodiments may save a considerable amount of time by reducing the number of samples taken in at least those regions. FIG. 15B shows the dark regions on the image of FIG. 15A to illustrate how samples will be taken across the surface, and is thus similar to FIG. 12 for the exemplary dining room scene. Darker areas will have fewer samples taken than lighter areas.

Exemplary System

Figure 16:
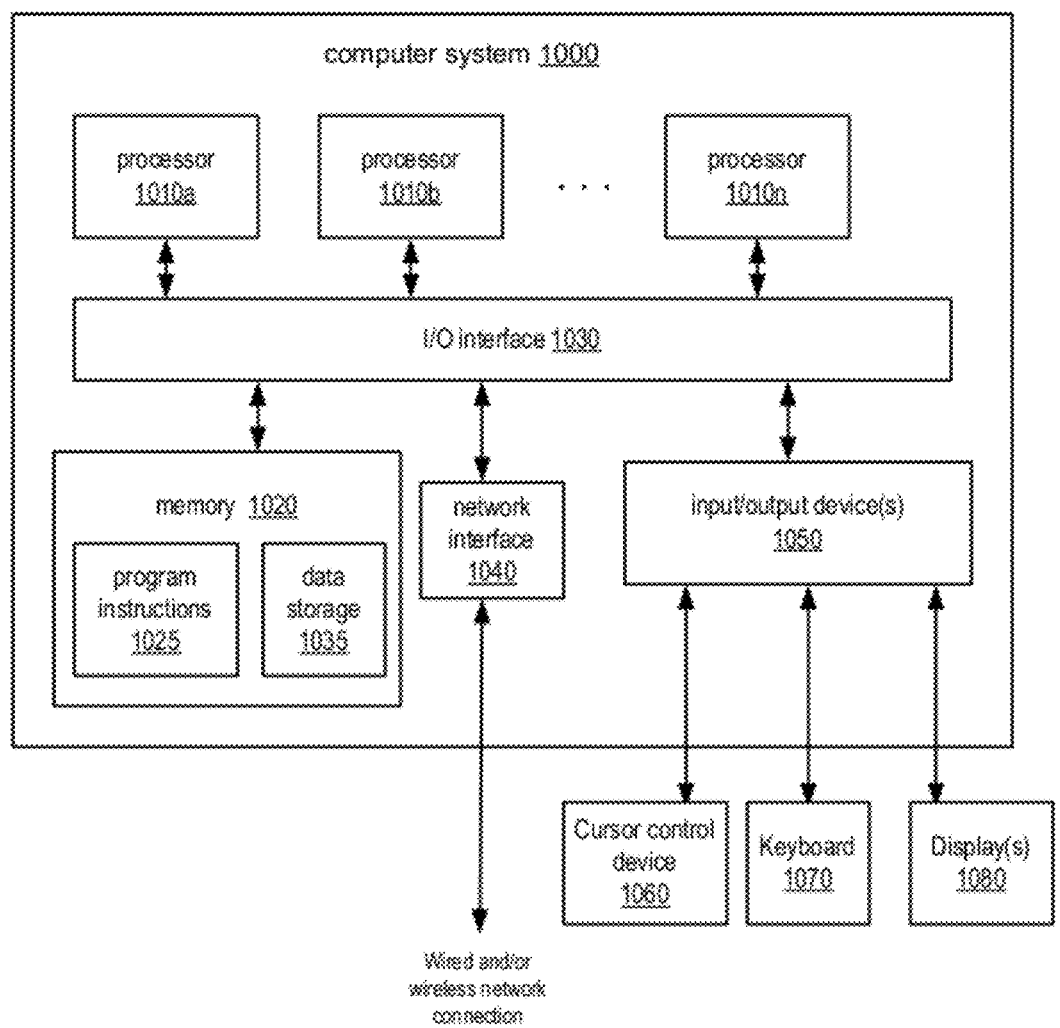
FIG. 16 illustrates an exemplary computer system that may be used in embodiments.

Various components of embodiments of a method and apparatus for diffuse indirect lighting computation as described herein, for example an indirect lighting module 600, or a global illumination rendering module 700 that includes a direct lighting component 704 and indirect lighting component 706, may be executed on one or more computer systems, which may interact with various other devices. Indirect lighting module 600 or indirect lighting component 706 may include, implement, or access an embodiment of the perceptual metrics algorithm implemented, for example, as a perceptual metrics module as described herein that may calculate a number of polar samples to be taken over a hemisphere corresponding to each location in a scene, and which thus may reduce the number of samples taken over a hemisphere at each location during irradiance computation. One such computer system is illustrated by FIG. 16. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of a method and apparatus for diffuse indirect lighting computation, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 16, memory 1020 may include program instructions 1025, configured to implement embodiments of method and apparatus for diffuse indirect lighting computation, and data storage 1035, comprising various data accessible by program instructions 1025. In one embodiment, program instructions 1025 may include software elements of embodiments of a method and apparatus for diffuse indirect lighting computation, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a method and apparatus for diffuse indirect lighting computation as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A computer-implemented method, comprising:
performing, by one or more computers:
for each location on each surface in a scene for which an irradiance value is to be computed:
predetermining a number of samples to be taken along a polar angle of a hemisphere above the surface at the respective location, wherein the hemisphere corresponds to and is centered on the respective location, and wherein the number of samples at the respective location is determined according to one or more perceptual metrics at the respective location; and
storing a value indicating the predetermined number of samples to be taken along the polar angle of the hemisphere corresponding to the respective location;
subsequent to said predetermining and said storing, computing irradiance for the scene, wherein said computing irradiance comprises, for each said location:
determining a total number of samples to take for the respective location from the stored value indicating the predetermined number of samples to be taken along the polar angle of the hemisphere corresponding to the respective location; and
calculating an irradiance value for the respective location according to the determined total number of samples for the respective location;
wherein the determined total number of samples used in calculating the irradiance values for the locations varies according to differences in the one or more perceptual metrics at the locations used in said predetermining the number of samples at the locations such that the total number of samples used at the locations in said computing irradiance for the scene varies for different locations in the scene; and
rendering the scene in accordance with the calculated irradiance values.

2. The computer-implemented method as recited in claim 1, wherein the one or more perceptual metrics include a direct illumination metric, a surface texture metric, and a color metric.

3. The computer-implemented method as recited in claim 1, wherein said determining a number of samples to be taken along a polar angle of a hemisphere above the surface and corresponding to and centered on the location according to one or more perceptual metrics at the location comprises:

calculating a baseline number of samples according to a direct illumination metric;

calculating a number of samples to add according to a surface texture metric; and scaling the sum of the baseline number of samples and the number of samples to add by a color metric to generate the number of samples to be taken along the polar angle.

4. The computer-implemented method as recited in claim 1, wherein the one or more perceptual metrics include a direct illumination metric, wherein the direct illumination metric corresponds to a level of direct lighting at a location, wherein fewer samples are taken at a location if the level of direct lighting at the location is high and more samples are taken at a location if the level of direct lighting at the location is low.

5. The computer-implemented method as recited in claim 1, wherein the one or more perceptual metrics include a surface texture metric, wherein fewer samples are taken at a location if a region corresponding to the location is highly textured and more samples are taken at a location if a region corresponding to the location is not highly textured.

6. The computer-implemented method as recited in claim 1, wherein the one or more perceptual metrics include a color metric, wherein fewer samples are taken at a location if a diffuse texture of a region corresponding to the location is dark and more samples are taken at a location if a diffuse texture of a region corresponding to the location is light.

7. The computer-implemented method as recited in claim 1, wherein said determining a total number of samples to take for the location from the determined number of samples to be taken along the polar angle of the hemisphere corresponding to the location comprises:

determining a number of samples to be taken along an azimuthal angle of the hemisphere, wherein the number of samples to be taken along the azimuthal angle is proportional to the number of samples along the polar angle multiplied by $\pi$;

wherein the total number of samples to take for the location is a multiplication of the determined number of samples along the polar angle and the determined number of samples along the azimuthal angle.

8. The computer-implemented method as recited in claim 1, wherein said calculating an irradiance value for the location according to the total number of samples comprises:

distributing the total number of samples over the hemisphere; and integrating irradiance information obtained from the samples over the hemisphere to generate an irradiance value for the location.

9. The computer-implemented method as recited in claim 8, wherein said distributing the total number of samples over the hemisphere is performed in accordance with a jittered sampling technique.

10. The computer-implemented method as recited in claim 1, wherein the total number of samples is N, wherein said calculating an irradiance value for the location according to the total number of samples N comprises casting N sample rays outward over the hemisphere around the location to estimate a sum of incoming indirect light to the location.

11. The computer-implemented method as recited in claim 1, wherein, the location corresponds to a surface point in a ray tracing technique.

12. The computer-implemented method as recited in claim 1, wherein, the location corresponds to a surface fragment in a rasterization technique.

13. The computer-implemented method as recited in claim 1, further comprising, for each location on each surface in the scene, calculating a direct lighting value for the location, wherein said rendering the scene is performed in accordance with the calculated irradiance values and the calculated direct lighting values.

14. A system, comprising:

at least one processor; and a memory comprising program instructions, wherein the program instructions are executable by the at least one processor to:

for each location on each surface in a scene for which an irradiance value is to be computed:

predetermine a number of samples to be taken along a polar angle of a hemisphere above the surface at the respective location, wherein the hemisphere corresponds to and is centered on the respective location, and wherein the number of samples at the respective location is determined according to one or more perceptual metrics at the respective location; and store a value indicating the predetermined number of samples to be taken along the polar angle of the hemisphere corresponding to the respective location;

subsequent to said predetermining and said storing, compute irradiance for the scene, wherein, to compute irradiance for the scene, the program instructions are executable by the at least one processor to, for each said location:

determine a total number of samples to take for the respective location from the stored value indicating the predetermined number of samples to be taken along the polar angle of the hemisphere corresponding to the respective location; and calculate an irradiance value for the respective location according to the determined total number of samples for the respective location;

wherein the determined total number of samples used in calculating the irradiance values for the locations varies according to differences in the one or more perceptual metrics at the locations used to predetermine the number of samples at the locations such that the total number of samples used at the locations to compute irradiance for the scene varies for different locations in the scene; and render the scene in accordance with the calculated irradiance values.

15. The system as recited in claim 14, wherein the one or more perceptual metrics include a direct illumination metric, a surface texture metric, and a color metric.

16. The system as recited in claim 14, wherein, to determine a number of samples to be taken along a polar angle of a hemisphere above the surface and corresponding to and centered on the location according to one or more perceptual metrics at the location, the program instructions are executable by the at least one processor to:

calculate a baseline number of samples from a direct illumination metric;

calculate a number of samples to add from a surface texture metric; and scale the sum of the baseline number of samples and the number of samples to add by a color metric to generate the number of samples to be taken along the polar angle.

17. The system as recited in claim 14, wherein, to determine a total number of samples to take for the location from the determined number of samples to be taken along the polar angle of the hemisphere corresponding to the location, the program instructions are executable by the at least one processor to:

determine a number of samples to be taken along an azimuthal angle of the hemisphere, wherein the number of samples to be taken along the azimuthal angle is proportional to the number of samples along the polar angle multiplied by $\pi$;

wherein the total number of samples to take for the location is a multiplication of the determined number of samples along the polar angle and the determined number of samples along the azimuthal angle.

18. The system as recited in claim 14, wherein, to calculate an irradiance value for the location according to the total number of samples, the program instructions are executable by the at least one processor to:

distribute the total number of samples over the hemisphere; and integrate irradiance information obtained from the samples over the hemisphere to generate an irradiance value for the location.

19. The system as recited in claim 18, wherein, to distribute the total number of samples over the hemisphere, the program instructions are executable by the at least one processor to distribute the total number of samples in accordance with a jittered sampling technique.

20. The system as recited in claim 14, wherein, the location corresponds to a surface point in a ray tracing technique.

21. The system as recited in claim 14, wherein, the location corresponds to a surface fragment in a rasterization technique.

22. A non-transitory computer-readable storage medium storing program instructions, wherein the program instructions are computer-executable to implement:

for each location on each surface in a scene for which an irradiance value is to be computed:

predetermining a number of samples to be taken along a polar angle of a hemisphere above the surface at the respective location, wherein the hemisphere corresponds to and centered on the respective location, and wherein the number of samples at the respective location is determined according to one or more perceptual metrics at the respective location; and storing a value indicating the predetermined number of samples to be taken along the polar angle of the hemisphere corresponding to the respective location;

subsequent to said predetermining and said storing, computing irradiance for the scene, wherein, in said computing irradiance, the program instructions are computer-executable to implement, for each said location:

determining a total number of samples to take for the respective location from the stored value indicating the predetermined number of samples to be taken along the polar angle of the hemisphere corresponding to the respective location; and calculating an irradiance value for the respective location according to the determined total number of samples for the respective location;

wherein the determined total number of samples used in calculating the irradiance values for the locations varies according to differences in the one or more perceptual metrics at the locations used in said predetermining the number of samples at the locations such that the total number of samples used at the locations in said computing irradiance for the scene varies for different locations in the scene; and rendering the scene in accordance with the calculated irradiance values.

23. The non-transitory computer-readable storage medium as recited in claim 22, wherein the one or more perceptual metrics include a direct illumination metric, a surface texture metric, and a color metric.

24. The non-transitory computer-readable storage medium as recited in claim 22, wherein, in said determining a number of samples to be taken along a polar angle of a hemisphere above the surface and corresponding to and centered on the location according to one or more perceptual metrics at the location, the program instructions are computer-executable to implement:

calculating a baseline number of samples from a direct illumination metric;

calculating a number of samples to add from a surface texture metric; and scaling the sum of the baseline number of samples and the number of samples to add by a color metric to generate the number of samples to be taken along the polar angle.

25. The non-transitory computer-readable storage medium as recited in claim 22, wherein, in said determining a total number of samples to take for the location from the determined number of samples to be taken along the polar angle of the hemisphere corresponding to the location, the program instructions are computer-executable to implement:

determining a number of samples to be taken along an azimuthal angle of the hemisphere, wherein the number of samples to be taken along the azimuthal angle is proportional to the number of samples along the polar angle multiplied by $\pi$;

wherein the total number of samples to take for the location is a multiplication of the determined number of samples along the polar angle and the determined number of samples along the azimuthal angle.

26. The non-transitory computer-readable storage medium as recited in claim 22, wherein, in said calculating an irradiance value for the location according to the total number of samples, the program instructions are computer-executable to implement:

distributing the total number of samples over the hemisphere; and integrating irradiance information obtained from the samples over the hemisphere to generate an irradiance value for the location.

27. The non-transitory computer-readable storage medium as recited in claim 26, wherein, in said distributing the total number of samples over the hemisphere, the program instructions are computer-executable to implement distributing the total number of samples in accordance with a jittered sampling technique.

28. The non-transitory computer-readable storage medium as recited in claim 22, wherein, the location corresponds to a surface point in a ray tracing technique.

29. The non-transitory computer-readable storage medium as recited in claim 22, wherein, the location corresponds to a surface fragment in a rasterization technique.

30. A system, comprising:

at least one processor; and a memory comprising program instructions, wherein the program instructions are executable by the at least one processor to implement a perceptual metrics module configured to, for each location on each surface in a scene for which an irradiance value is to be computed:

predetermine a number of samples to be taken along a polar angle of a hemisphere above the surface at the respective location, wherein the hemisphere corresponds to and is centered on the location, and wherein the number of samples at the respective location is determined according to one or more perceptual metrics at the location; and store a value indicating the predetermined number of samples to be taken along the polar angle of the hemisphere;

wherein the program instructions are further executable by the at least one processor to implement an indirect lighting module configured to, subsequent to said predetermining and said storing, for each location on each surface in the scene for which an irradiance value is to be computed:

determine a total number of samples to take for the location from the stored value indicating the predetermined number of samples to be taken along the polar angle of the hemisphere corresponding to the location; and calculate an irradiance value for the location according to the total number of samples;

wherein the determined total number of samples used in calculating the irradiance values for the locations varies according to differences in the one or more perceptual metrics at the locations used to predetermine the number of samples at the locations such that the total number of samples used at the locations to calculate irradiance values for the scene varies for different locations in the scene; and wherein the program instructions are further executable by the at least one processor to implement a global illumination rendering module configured to render the scene in accordance with the calculated irradiance values.

31. The system as recited in claim 30, wherein the program instructions are further executable by the at least one processor to implement a direct lighting module configured to, for each location on each surface in the scene, calculate a direct lighting value for the location, wherein the global illumination rendering module is configured to render the scene in accordance with the calculated irradiance values and the calculated direct lighting values.

32. A system, comprising:
at least one processor; and
a memory comprising program instructions, wherein the program instructions are executable by the at least one processor to implement an indirect lighting module configured to, for each location on each surface in a scene for which an irradiance value is to be computed:

predetermine a value indicating a number of samples to be taken along a polar angle of a hemisphere above the surface at the respective location, wherein the hemisphere corresponds to and is centered on the location, and wherein the number of samples at the respective location is determined according to one or more perceptual metrics at the location;

determine a total number of samples to take for the location from the value indicating the predetermined number of samples to be taken along the polar angle of the hemisphere corresponding to the location; and calculate an irradiance value for the location according to the determined total number of samples for the respective location;

wherein the determined total number of samples used in calculating the irradiance values for the locations varies according to differences in the one or more perceptual metrics at the locations used to predetermine the number of samples at the locations such that the total number of samples used at the locations to calculate irradiance values for the scene varies for different locations in the scene; and wherein the program instructions are further executable by the at least one processor to implement a global illumination rendering module configured to render the scene in accordance with the calculated irradiance values.

33. The system as recited in claim 32, wherein the program instructions are further executable by the at least one processor to implement a direct lighting module configured to, for each location on each surface in the scene, calculate a direct lighting value for the location, wherein the global illumination rendering module is configured to render the scene in accordance with the calculated irradiance values and the calculated direct lighting values.

* * * * *